(12) United States Patent
Determann

(10) Patent No.: US 11,008,226 B2
(45) Date of Patent: May 18, 2021

(54) BRINE SOLUTION CLEANING SYSTEMS, APPARATUSES, AND METHODS

(71) Applicant: National Beef Packing Company, LLC, Kansas City, MO (US)

(72) Inventor: Donald Joseph Determann, Dodge City, KS (US)

(73) Assignee: National Beef Packing Company, LLC, Kansas City, MO (US)

( * ) Notice: Subject to any disclaimer, the term of this patent is extended or adjusted under 35 U.S.C. 154(b) by 0 days.

(21) Appl. No.: 16/593,940

(22) Filed: Oct. 4, 2019

(65) Prior Publication Data

US 2020/0109064 A1 Apr. 9, 2020

Related U.S. Application Data

(60) Provisional application No. 62/742,086, filed on Oct. 5, 2018.

(51) Int. Cl.
  *C02F 1/06* (2006.01)
  *B01D 1/00* (2006.01)
  *B01D 5/00* (2006.01)

(52) U.S. Cl.
  CPC .............. *C02F 1/06* (2013.01); *B01D 1/0064* (2013.01); *B01D 5/006* (2013.01)

(58) Field of Classification Search
  CPC ..... C02F 1/06; B01D 1/10; B01D 1/12; B01D 1/0064; B01D 5/006
  See application file for complete search history.

(56) References Cited

U.S. PATENT DOCUMENTS

| | | | | |
|---|---|---|---|---|
| 3,165,547 A | * | 1/1965 | Sauer | C07C 51/31 562/408 |
| 2016/0046500 A1 | * | 2/2016 | McAninch | C01D 3/14 423/499.5 |

* cited by examiner

*Primary Examiner* — Brian A McCaig
(74) *Attorney, Agent, or Firm* — Seth Black; Black IP, PLLC

(57) ABSTRACT

Systems, apparatuses, and methods for cleaning brine solution are provided. In particular, one or more embodiments comprise a brine cleaning system that includes a brine cooker, a brine filter, and a brine storage unit. The brine cooker heats a dirty brine solution to separate the dirty brine solution into a liquid portion and a solids portion. The brine filter is coupled to the brine cooker to receive the liquid portion and the solids portion from the brine cooker and then substantially remove the solids portion. The brine storage unit is coupled to the brine filter to accumulate the liquid portion once the solids portion have been substantially removed by the brine filter. This allows for more efficient and environmentally friendly use of brine solution in the curing of animal.

19 Claims, 11 Drawing Sheets

BRINE SOLUTION CLEANING SYSTEMS, APPARATUSES, AND METHODS

CROSS-REFERENCE TO RELATED APPLICATIONS

This application claims the benefit of, and priority to, U.S. Provisional Patent Application No. 62/742,086, entitled "BRINE CLEANING SYSTEMS, APPARATUSES, AND METHODS," filed Oct. 5, 2018, the entire contents of which are hereby expressly incorporated by reference in its entirety.

FIELD

Embodiments of the present invention generally concern one or more aspects of cleaning brine solution. More particularly, at least some embodiments of the invention relate to systems, apparatuses, and methods directed to brine solution cleaning that provides for greater reuse of salt from brine solution, as well as more environmentally friendly management of dirty brine solution.

BACKGROUND

Brine curing is a process in which animal hides are treated with common salt to prevent the bacterial and enzymatic decomposition of the hides within the first few hours of removing the hides from slaughtered animals. In brine curing, the hides are in contact with saturated brine solution at all times and can typically be fully cured within about 24 hours.

One common method of brine curing hides uses brine curing hide vats, also known as raceways, which are typically oval shaped with an oval island in the center. Mechanical paddles within the brine curing hide vats cause the hides to move slowly around and around within the saturated brine solution. Moisture is drawn from the fresh hides by the brine solution deposited within the brine curing hide vats. To prevent dilution, a portion of the brine solution is usually circulated through a salt dissolving chamber, commonly known as a lixator. This serves the dual purpose of keeping the brine solution close to a desired saturation level and filtering out some of the dirt and other solids suspended in the brine solution. Typically, the brine solution is passed through a rotary screen to remove hair and fat prior to going to the lixator. However, in some applications, fine salt is slowly added to the brine curing hide vats along with the hides and the turbulence provided by the mechanical paddles is relied on to keep the brine solution up to the desired saturation level.

Accordingly, FIG. 1A is a schematic diagram illustrating a prior art meat processing system 100 (or simply "system 100") for processing domesticated meat animals, such as cattle. An overview of system 100 will be described in relation to FIG. 1A. Thereafter, a more detailed description of some of the components and processes of system 100 will be described.

As illustrated by FIG. 1A, the system 100 includes meat processing facility 110, commonly known as a slaughterhouse or meat packing plant. Meat processing facility 110 further includes hide processing system 120, which handles the disposition of animal hides once they have been removed from the animals. Further, hide processing system 120 typically includes brine curing system 130, which handles the preservation of the fresh hides for later use. Moreover, brine curing system 130 typically includes brine curing hide vats 140, as already described above, which uses a brine solution to cure the hides and then provides a used or dirty brine solution 150 to an evaporator and salt concentrator 160. The evaporator and salt concentrator 160 is employed to clean, recycle, and appropriately dispose of the dirty brine solution 150 used in the brine curing hide vats 140.

Turning to FIG. 1B, a detailed schematic diagram illustrates a prior art evaporator and salt concentrator 160 that is commonly employed in the brine curing system 130 of FIG. 1A. More specifically, FIG. 1B shows that evaporator and salt concentrator 160 includes a vapor separator 162. Vapor separator 162 receives a dirty brine solution 150 (e.g., from brine curing hide vats 140 of FIG. 1A) and heats the dirty brine solution 150 to about 180-185 degrees Fahrenheit. The bottom of vapor separator 162 is connected to a lower chamber 164. As the dirty brine solution 150 is heated within the vapor separator 162, the dirty brine solution 150 also flows down the lower chamber 164. A pump 166 is then used at the bottom of lower chamber 164 to circulate dirty brine solution 150 into a flash separator 168. The flash separator 168 then continues to circulate the dirty brine solution 150 back into vapor separator 162. As the dirty brine solution 150 is heated and circulates in this manner, a vacuum 170 is applied to the vapor separator 162 to remove water vapor 171 from vapor separator 162 and move that water vapor 171 to condenser 172 before that water vapor 171 is disposed of into hot well 174.

With reference to FIG. 1C, a detailed schematic diagram illustrates additional features of a prior art evaporator and salt concentrator 160. In particular, FIG. 1C depicts that evaporator and salt concentrator 160 receives a dirty brine solution 150 and further includes vapor separator 162, lower chamber 164, pump 166, flash separator 168, vacuum 170, condenser 172, and hot well 174 as previously described with respect to FIG. 1B. Moreover, FIG. 1C depicts that vapor separator 162 receives the dirty brine solution 150 at inlet 163. Further, as the dirty brine solution 150 is heated and circulated, a portion of the dirty brine solution 150 is pumped out of the bottom of flash separator 168 by pump 167. Pump 167 moves the portion of the dirty brine solution 150, which is typically in the form of a slurry of 20-30% salt crystal, into a salt settler 176 where that is refined into 90% crystal and then fed by an auger 178 back into brine curing hide vats 179. At the salt settler 176, any remaining slurry or liquid from the portion of the dirty brine solution 150 is pumped by pump 169 back into the bottom of flash separator 168 to continue the cleaning, recycling, and disposal of the dirty brine solution 150. Additionally, as the dirty brine solution 150 circulates, vacuum 170 moves water vapor 171 into condenser 172. Condenser 172 receives potable cold water 173 and outputs warm water at about 150 degrees Fahrenheit to a hot water storage 175, in addition to outputting water to be disposed at hot well 174. Thus, this circulation of the dirty brine solution 150 through vapor separator 162, down into lower chamber 164, back up flash separator 168, and returning into vapor separator 162 serves to further separate the water of the dirty brine solution 150 from the salt of the dirty brine solution 150, thereby effectively assisting in the cleaning, recycling, and disposal of the dirty brine solution.

Given this background, one problem with conventional brine curing systems, such as brine curing system 130, is that solids within the dirty brine solution, namely coagulants such as proteins, coagulate within vapor separators, such as vapor separator 162, creating blockages that ultimately lead to the failure of evaporators and salt concentrators, such as evaporator and salt concentrator 160.

Another problem with conventional brine curing systems is that solids within the dirty brine solution, namely coagulants such as proteins, coagulate and reduce the efficiency of evaporators and salt concentrators without actually creating blockages that lead to system failure. Even reduced efficiency of evaporators and salt concentrators leads to increased system downtime due to a greater need for cleaning and other maintenance, as well as decreased effective evaporation from condensers used to appropriately clean, recycle, and dispose of the water within the dirty brine solution.

Furthermore, yet another problem with conventional brine curing systems is that because they fail to adequately remove a sufficient amount of solids within the dirty brine solution such systems do not allow for the proper disposal of waste from the dirty brine solutions. More specifically, conventional brine curing systems create wastewater and other solid waste that cannot be disposed of in an environmentally friendly manner due in part to failing to separate the solid waste from the liquid waste that is contained in the dirty brine solution created by such systems.

In view of the problems such as those noted above, and others, it would be useful to provide brine solution cleaning systems, apparatuses, and methods that remove the solids within the dirty brine solution, such as coagulents like proteins, dirt, and others. Additionally, it would be useful to provide brine solution cleaning systems, apparatuses, and methods that facilitate the more efficient operation of evaporators and salt concentrators. Lastly, it would be useful to provide brine solution cleaning systems, apparatuses, and methods that enable the proper and more environmentally friendly disposal of solid and liquid waste from dirty brine solution created during the brine curing of hides.

SUMMARY

According to teachings of one or more embodiments of the present invention, a brine cleaning system includes a brine cooker that heats a dirty brine solution to separate the dirty brine solution into a liquid portion and a solids portion. The brine cleaning system also includes a brine filter that removes the solids portion, as the brine filter is coupled to the brine cooker to receive the liquid portion and the solids portion from the brine cooker. The brine cleaning system also includes a brine storage unit that accumulates the liquid portion, as the brine storage unit is coupled to the brine filter to receive the liquid portion from the brine filter.

Optionally, in one or more embodiments of the inventive system, the brine cleaning system can include additional elements. For example, the brine cleaning system can include an incline having a first end and a second end, the first end of the incline coupled to a top of the brine cooker and the second end of the incline coupled to a top of the brine filter to provide a flow of the solids portion from the brine cooker to the brine filter down the incline. As another example, the brine cleaning system can include a brine curing hide vat that creates the dirty brine solution, as the brine curing hide vat is coupled to the brine cooker to provide the dirty brine solution to the brine cooker. In particular, the brine cleaning system can include a pipe having a first end and a second end, the first end of the pipe coupled to an outlet of the brine curing hide vat and the second end of the pipe coupled to an inlet of the brine cooker.

Moreover, the brine cleaning system can include an evaporator and salt concentrator that separates the liquid portion into a water portion and a salt portion, as the evaporator and salt concentrator is coupled to the brine storage unit to receive the liquid portion from the brine storage unit. More specifically, the brine cleaning system can include a pipe having a first end and a second end, as the first end of the pipe is coupled to an outlet of the brine storage unit and the second end of the pipe is coupled to an inlet of the evaporator and salt concentrator.

Furthermore, the brine cleaning system can include a lower pipe, an upper pipe, and an incline. In one or more embodiments, the lower pipe has a first end and a second end, as the first end of the lower pipe is coupled to a lower outlet of the brine cooker and the second end of the lower pipe is coupled to an inlet of the brine filter, the lower pipe providing a first flow of the liquid portion from the brine cooker to the brine filter. The upper pipe has a first end and a second end, as the first end of the upper pipe is coupled to an upper outlet of the brine cooker and the second end of the upper pipe is coupled to the inlet of the brine filter, the upper pipe providing a second flow of the liquid portion from the brine cooker to the brine filter. Furthermore, the incline has a first end and a second end, as the first end of the incline is coupled to a top the brine cooker and the second end is coupled to the inlet of the brine filter, the incline providing a flow of the solids portion from the brine cooker to the brine filter.

According to other teachings of one or more embodiments of the present invention, a brine cleaning system includes a brine cooker, a brine filter, and a brine storage unit. The brine cooker includes a brine container and a heating element. The brine container holds the dirty brine solution and the heating element heats the dirty brine solution within the brine container. Also, the brine filter includes a first filter, a second filter, and a third filter. The first filter cleans the dirty brine solution, the second filter cleans the dirty brine solution after the first filter, and the third filter cleans the dirty brine solution after the second filter.

Alternatively, the heating element can include a plurality of sparging tubes. More specifically, the plurality of sparging tubes can include a first array of sparging tubes and a second array of sparging tubes positioned below the first array of sparging tubes. Even further, the heating element can include one of a cable heater, a cartridge heater, a ceramic fiber heater, a flexible heater, a strip heater, a tubular heater, or an immersion heater.

Also in one or more embodiments of the present invention, a pump can be positioned between the second filter and the third filter, the pump facilitating a flow of the dirty brine solution from the second filter of the brine filter to the third filter of the brine filter. Moreover, the brine filter can include a solids outlet coupled to a filter housing and positioned between the first filter and the second filter and a liquid outlet coupled to the filter housing and positioned after the second filter. Additionally, in one or more embodiments of the brine filter, the first filter has a first fineness, the second filter has a second fineness, and the third filter has a third fineness, such that the first fineness is less than or equal to the second fineness and the second fineness is less than or equal to the third fineness.

According to yet even more teachings of one or more embodiments of the present invention, a method of cleaning brine includes separating solids within a dirty brine solution, removing solids from the dirty brine solution to create a cleaned brine solution, and accumulating the cleaned brine solution. The step of separating solids can further include heating the dirty brine solution. More specifically, heating the dirty brine solution can include heating the dirty brine solution at 212 degrees Fahrenheit for 10 minutes in order to cause solids within the dirty brine solution to coagulate.

Furthermore, in one or more embodiments of the present invention, the method of cleaning brine can include filtering solids from the dirty brine solution. In particular, this can include applying a first filter having a first fineness to the dirty brine solution, applying a second filter having a second fineness to the dirty brine solution; and, applying a third filter having a third fineness to the dirty brine solution to output the cleaned brine solution from the third filter. More specifically, this can include extracting solids larger than the first fineness from the dirty brine solution, extracting solids larger than the second fineness from the dirty brine solution, and extracting solids larger than the third fineness from the dirty brine solution.

In light of the foregoing, additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description or may be learned by the practice of such exemplary embodiments as set forth hereinafter.

BRIEF DESCRIPTION OF THE DRAWINGS

In order to describe the manner in which at least some aspects of this disclosure can be obtained, a more particular description will be rendered by reference to specific embodiments thereof which are illustrated in the accompanying drawings. Understanding that these drawings depict only example embodiments of the invention and are not therefore to be considered to be limiting of its scope, embodiments of the invention will be described and explained with additional specificity and detail through the use of the accompanying drawings, which include.

DETAILED DESCRIPTION

Figure 1A:
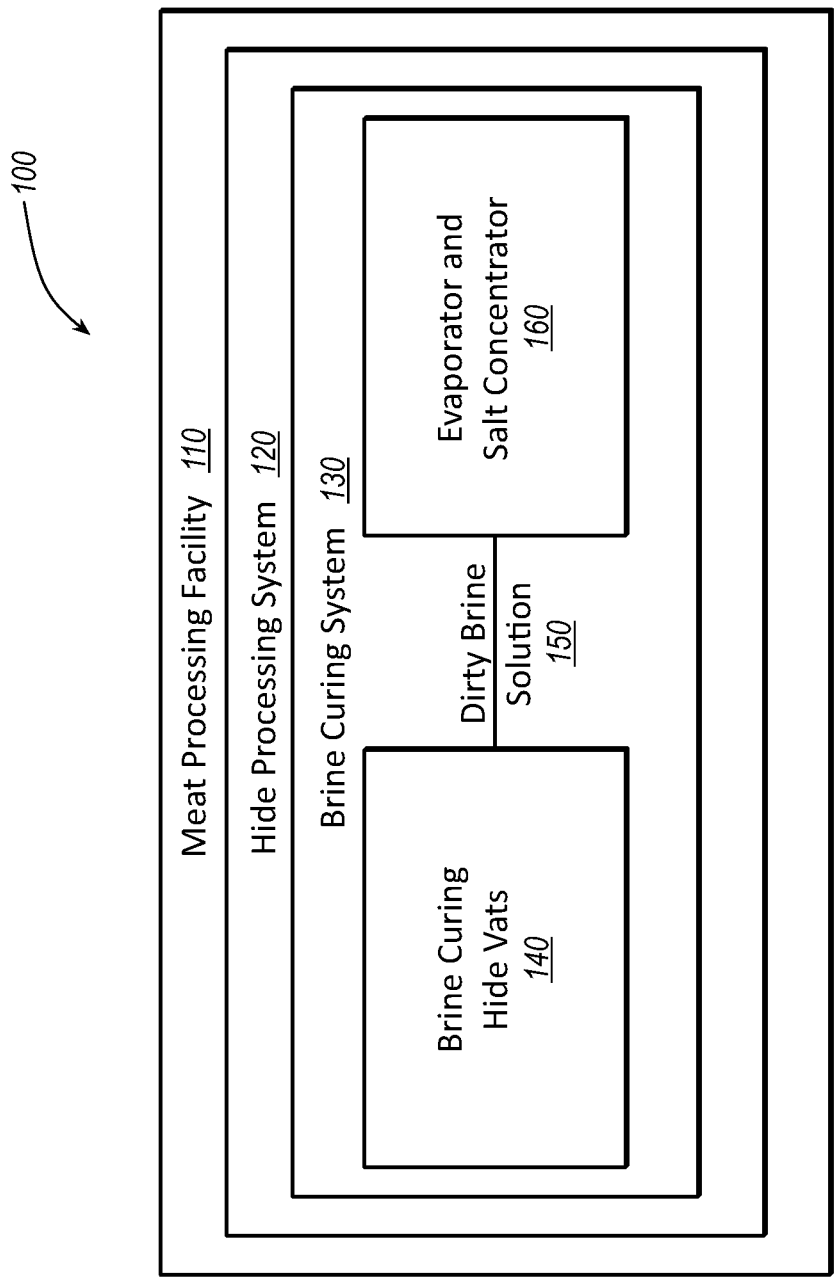
FIG. 1A is a schematic diagram of a prior art meat processing system.
Figure 1B:
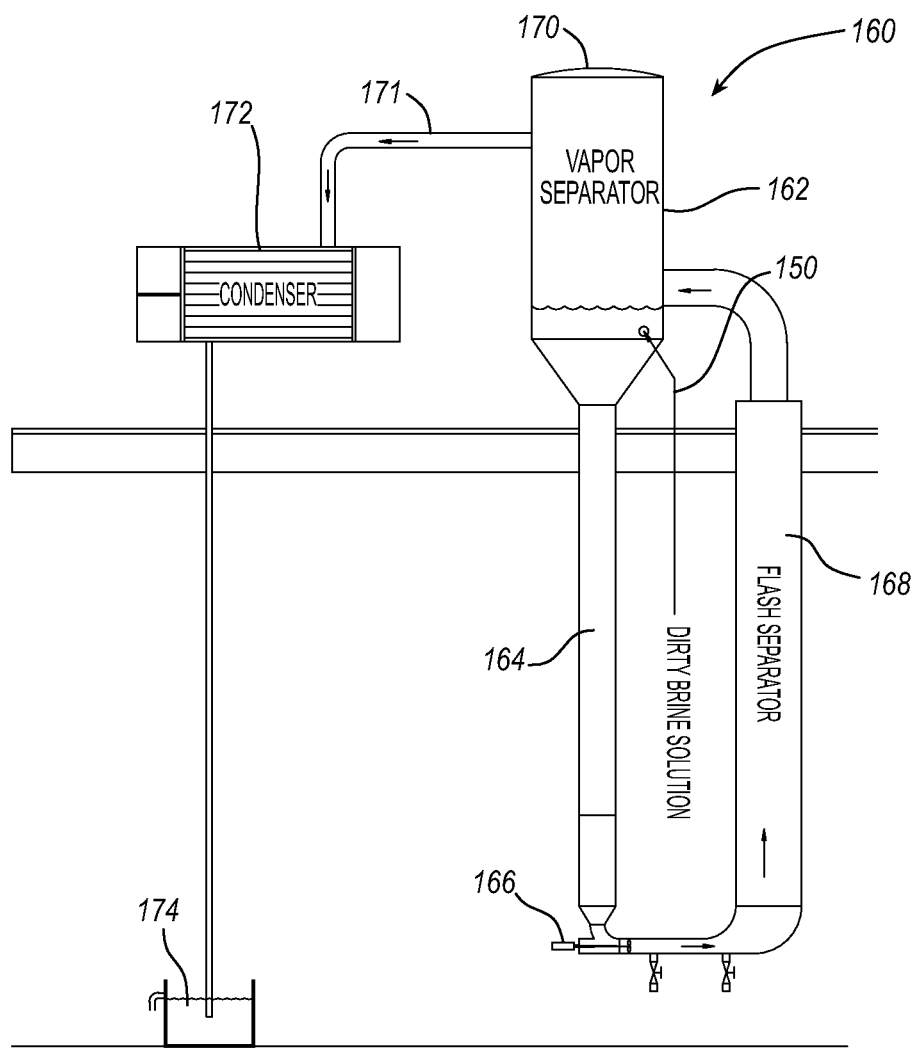
FIG. 1B is a detailed schematic diagram of a prior art evaporator and salt concentrator of the prior art meat processing system of FIG. 1A.
Figure 1C:
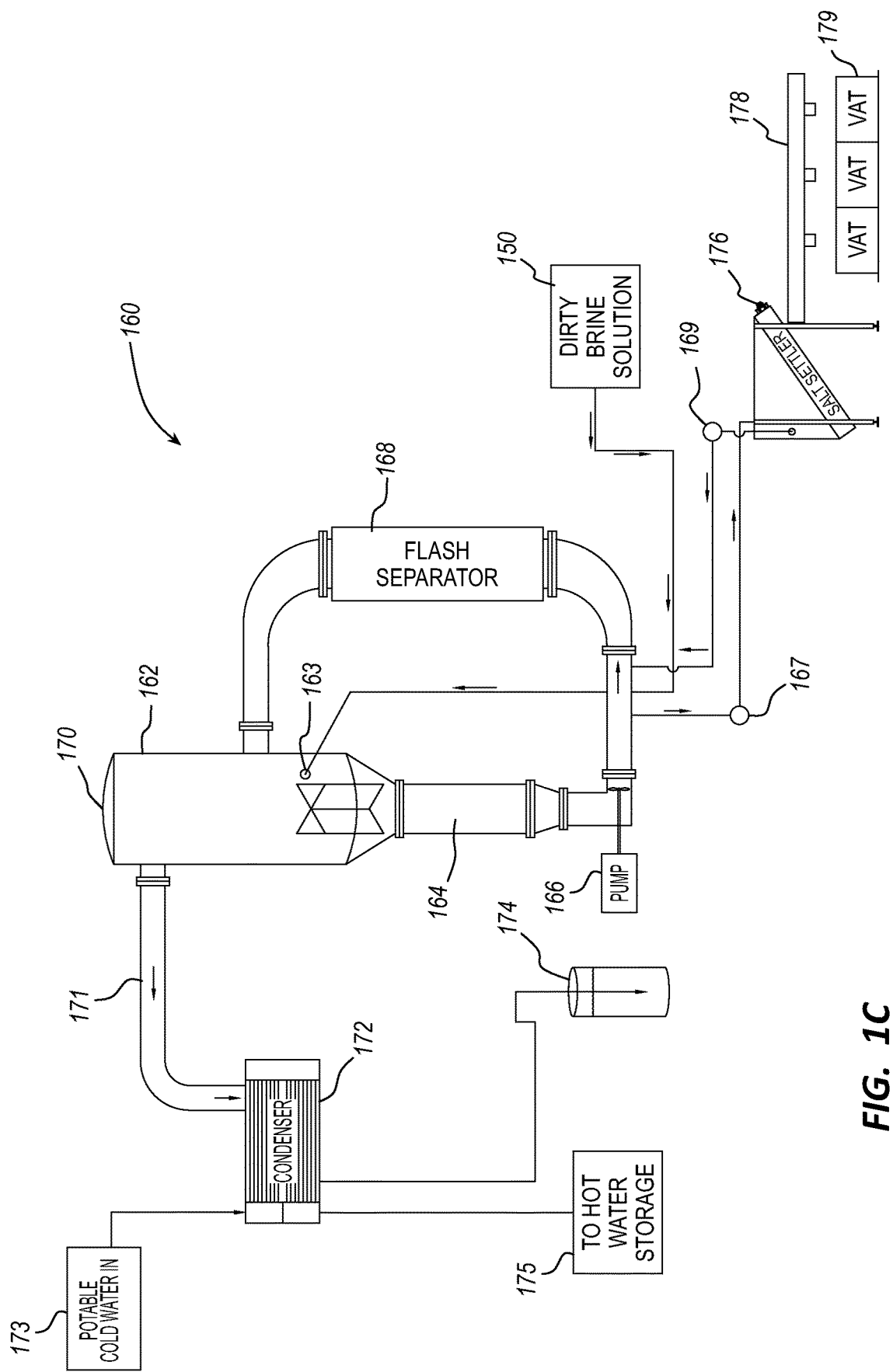
FIG. 1C is an additional detailed schematic diagram of additional aspects of the prior art evaporator and salt concentrator of FIG. 1B.

Embodiments of the present invention generally concern one or more aspects of cleaning brine solution. More particularly, at least some embodiments of the invention relate to a brine solution cleaning system that includes a brine cooker, a brine filter, and a brine storage unit. The brine cooker heats a dirty brine solution to separate the dirty brine solution into a liquid portion and a solids portion. The brine filter removes the solids portion from the dirty brine solution and is coupled to the brine cooker to receive the liquid portion and the solids portion of the dirty brine solution from the brine cooker. The brine storage unit accumulates the liquid portion of the dirty brine solution and is coupled to the brine filter to receive the liquid portion of the dirty brine solution from the brine filter.

Similarly, at least some embodiments of the invention relate to a brine cooker that includes a brine container, a heating element, and a solids outlet. The brine container holds a dirty brine solution. The heating element heats the dirty brine solution within the brine container to separate the dirty brine solution into a liquid portion and a solids portion. The solids outlet removes a portion of the solids portion of the dirty brine solution from the brine container.

Moreover, at least some embodiments of the invention relate to a brine filter that includes a first filter, a second filter, a liquid outlet, and a third filter. The first filter cleans a dirty brine solution. The second filter then cleans the dirty brine solution after the first filter. The liquid outlet then provides a flow of a liquid portion of the dirty brine solution after the second filter. The third filter cleans the flow of the liquid portion of the dirty brine solution and receives the flow of the liquid portion of the dirty brine solution from the liquid outlet.

Furthermore, at least some embodiments of the invention relate to a brine storage unit that includes a brine storage container, a liquid inlet, and a liquid outlet. The brine storage container holds a dirty brine solution. The liquid inlet is coupled to the brine storage container to receive the dirty brine solution into the brine storage container. The liquid outlet is coupled to the brine storage container to provide the dirty brine solution out of the brine storage container.

Additionally, at least some embodiments of the invention relate to a method of cleaning brine that includes separating solids within a dirty brine solution. Then, removing the solids from the dirty brine solution to create a clean brine solution. Following the removal of the solids to create the clean brine solution, the method includes accumulating the clean brine solution. Solids within a dirty brine solution, such as proteins and other coagulants, can be separated from a liquid portion of the dirty brine solution by heating the dirty brine solution to 212 degrees Fahrenheit for about 10 minutes. Additionally, solids can be removed from the dirty brine solution by employing a filter, such as a screen filter.

Figure 2A:
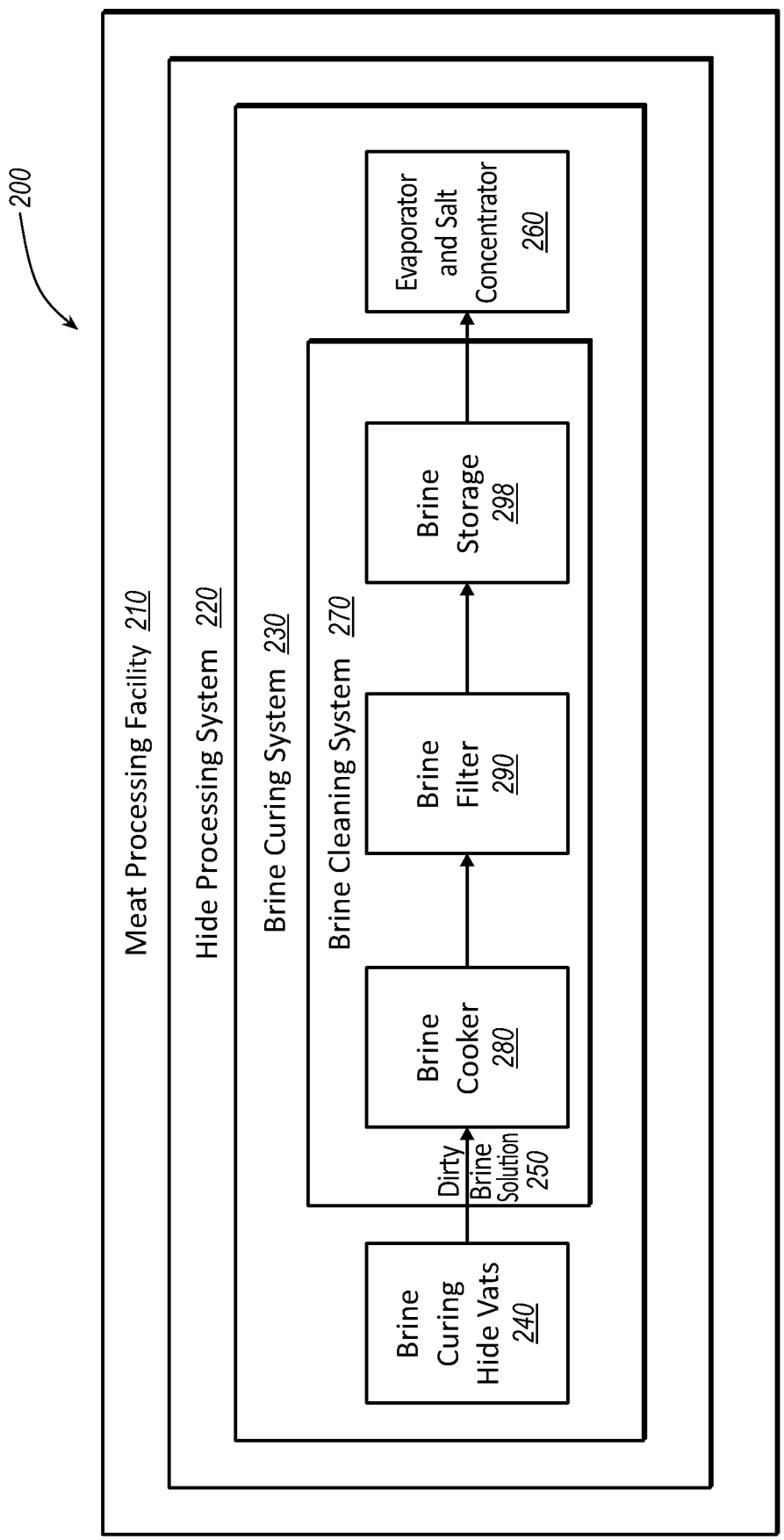
FIG. 2A is a schematic diagram of a meat processing system having a brine curing system in accordance with one or more embodiments of the invention.
Figure 2B:
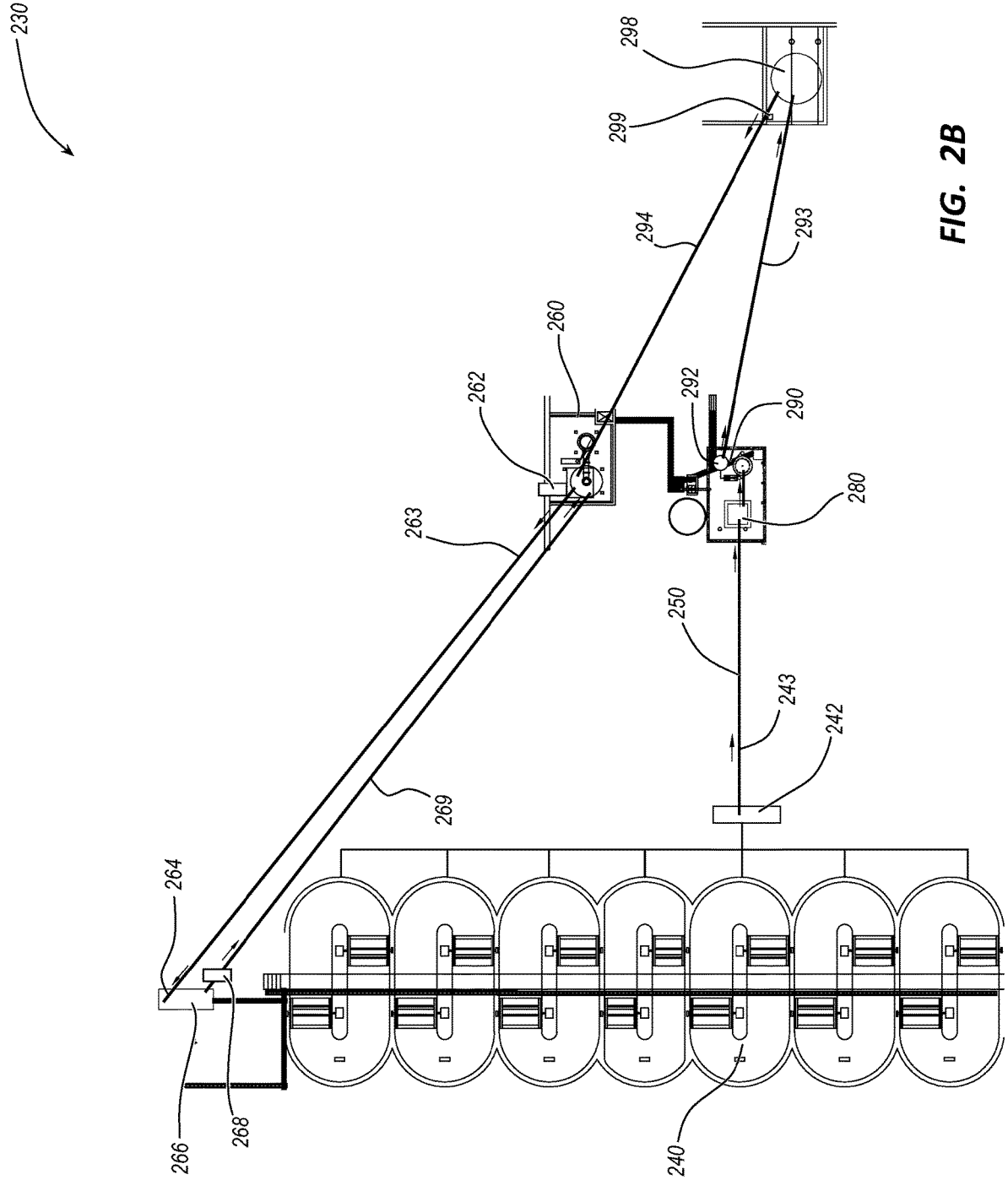
FIG. 2B is an overhead blueprint diagram of a brine curing system having a brine cleaning system in accordance with one or more embodiments of the invention.
Figure 2C:
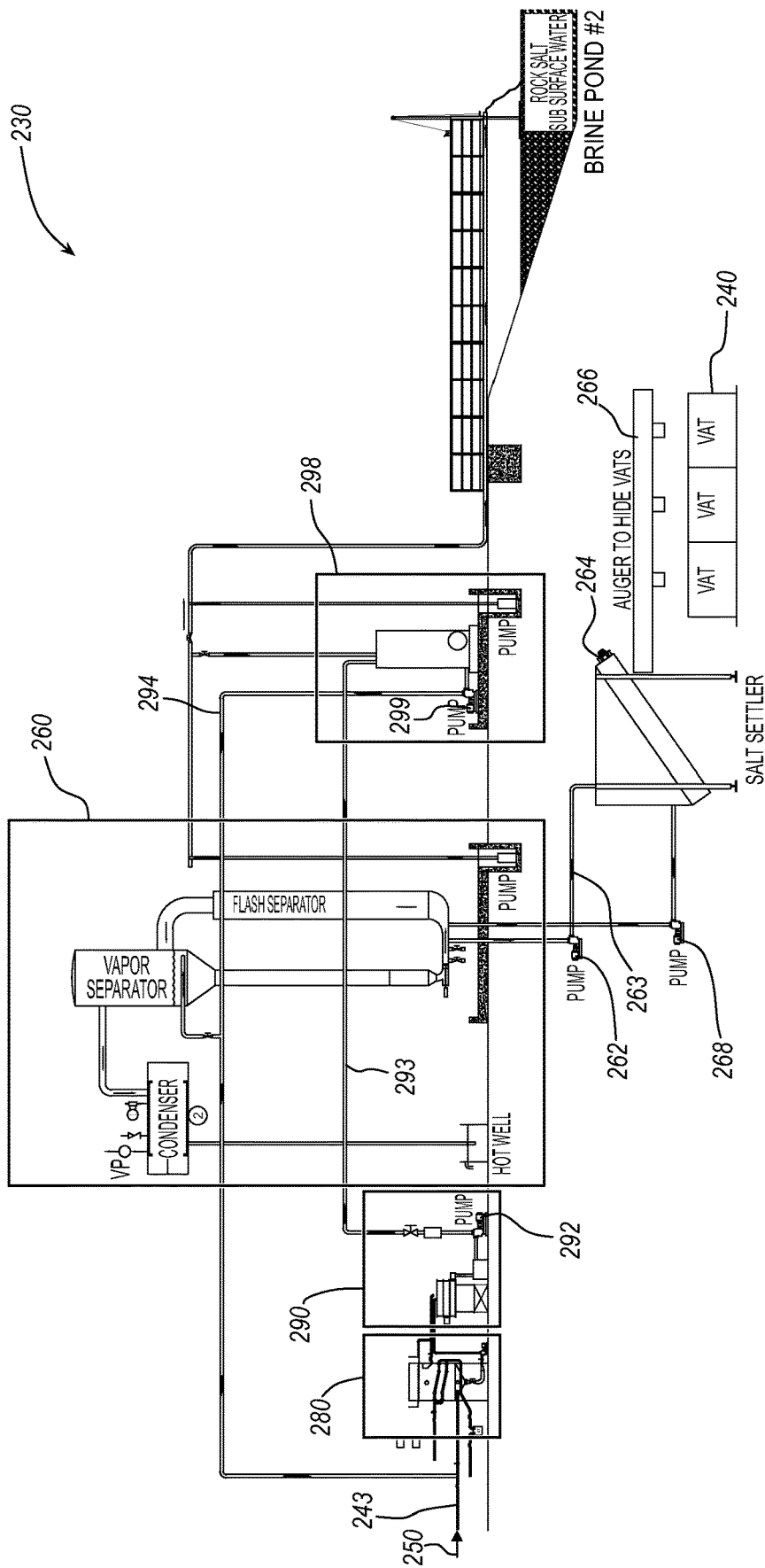
FIG. 2C is a detailed schematic diagram of a brine cleaning system having a brine cooker, brine filter, and brine storage in accordance with one or more embodiments of the invention.

In general, FIGS. 2A-2C show an example embodiment of a brine cleaning system that includes a brine cooker, a brine filter, and a brine storage. More specifically, FIG. 2A illustrates a schematic diagram of a meat processing system 200 that includes a meat processing facility 210 (e.g., a slaughterhouse or meat packing plant). Within meat processing facility 210, a hide processing system 220 is used to process the hides removed from the animals. Hide processing system 220 further includes brine curing system 230, which is used to preserve the hides and prevent them from decaying or decomposing.

Brine curing system 230 includes brine curing hide vats 240 in which fresh hides are immersed in brine solution. The dirty brine solution 250 created from the brine curing hide vats 240 is then sent to a brine cooker 280 of brine cleaning system 270 (e.g., using a pipe and a pump). Brine cooker 280 then heats the dirty brine solution 250 so that the dirty brine solution 250 separates into solid portions and liquid portions as a result of coagulation of the proteins and other organic material typically found in dirty brine solution 250. Once the dirty brine solution 250 has been heated sufficiently to separate into liquid and solid portions, the dirty brine solution 250 is sent (e.g., using an incline and/or a pipe and a pump) through to brine filter 290 to remove the solid portions from the dirty brine solution 250, leaving only a liquid portion of the dirty brine solution 250. The remaining liquid portion of the dirty brine solution 250 is then sent (e.g., using a pipe and a pump) to brine storage 298 where it is accumulated and can at that point be considered clean brine solution because the coagulated proteins and other organic material have been substantially removed such that the liquid portion of the dirty brine solution 250 is primarily only water and salt. Thus, the clean brine solution can then be sent (e.g., using a pipe and a pump) to evaporator and salt concentrator 260 for further cleaning, recycling, and disposal of the clean brine solution.

FIG. 2B illustrates an overhead blueprint diagram of a brine curing system 230 having brine curing hide vats 240 which create a dirty brine solution 250 that is pumped by pump 242 through a pipe 243 to brine cooker 280. Brine cooker 280 then heats the dirty brine solution 250 until it separates into liquid and solid portions. Then the liquid and solid portions of dirty brine solution 250 are moved from brine cooker 280 to brine filter 290 (e.g., using an incline and/or a pipe and a pump). Once brine filter 290 filters out the solid portion of dirty brine solution 250, then the liquid portion of dirty brine solution that made it through brine filter 290 is pumped by pump 292 through a pipe 293 to brine storage 298. Pump 299 then pumps the brine solution from brine storage 298 to evaporator and salt concentrator 260 over a pipe 294. Evaporator and salt concentrator 260 recycles the water and salt components of the brine solution by, in part, using pump 262 to pump a slurry of the brine solution through a pipe 263 to salt settler 264, which removes reusable salt crystals from the slurry and uses auger 266 to feed reusable salt crystals back into brine curing hide vats 240. Any slurry of the brine solution that is not reusable is then pumped by pump 268 through pipe 269 back to evaporator and salt concentrator 260.

FIG. 2C is a detailed schematic diagram of a brine cleaning system 230 having a brine cooker 280, brine filter 290, and brine storage 298. More specifically, brine cooker 280 receives dirty brine solution 250 from pipe 243 and heats the dirty brine solution 250 until it separates into liquid and solids portions. Then the liquid and solids portions of dirty brine solution 250 are passed to brine filter 290 which removes the solids portion from the dirty brine solution 250 and uses pump 292 to pass the liquid portion of dirty brine solution 250 to brine storage 298 through pipe 293. Brine storage 298 then accumulates the liquid portion of the dirty brine solution 250 that passed through the brine filter 290. Brine storage 298 also uses pump 299 to pass the liquid portion of the dirty brine solution 250 to evaporator and salt concentrator 260 through pipe 294, which further cleans, recycles, and disposes of the liquid portion of dirty brine solution 250. In particular, evaporator and salt concentrator 260 uses pump 262 to send a slurry of the dirty brine solution 250 through pipe 263 to a salt settler 264 which reuses salt crystals in the dirty brine solution 250 and feeds such reusable salt crystals back into brine curing hide vats 240 using auger 266. The salt settler 264 also pumps back any unused slurry through pipe 269 to the flash separator of evaporator and salt concentrator 260 using pump 268.

Figure 3A:
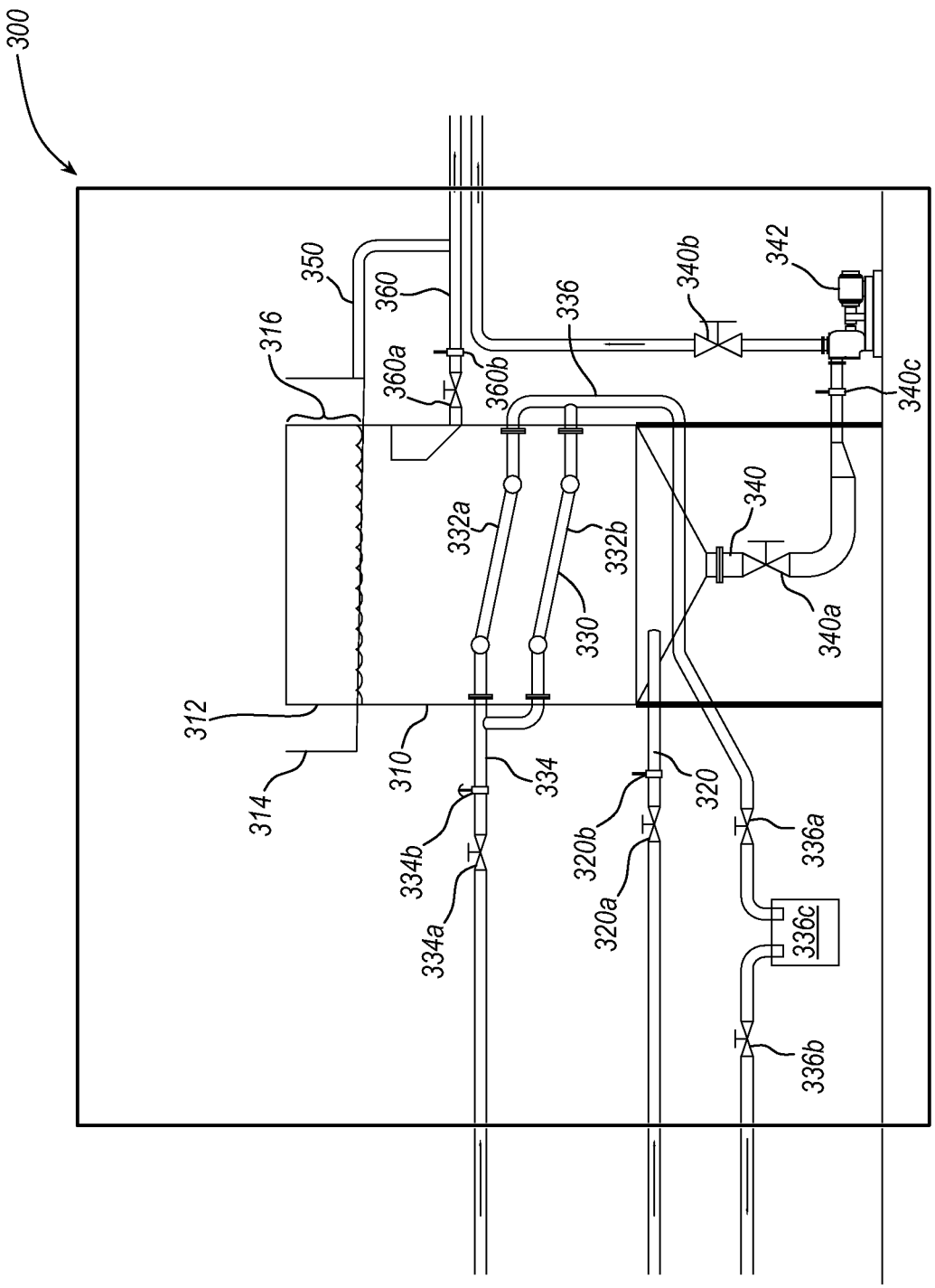
FIG. 3A is a detailed schematic diagram of a brine cooker in accordance with one or more embodiments of the invention.
Figure 3B:
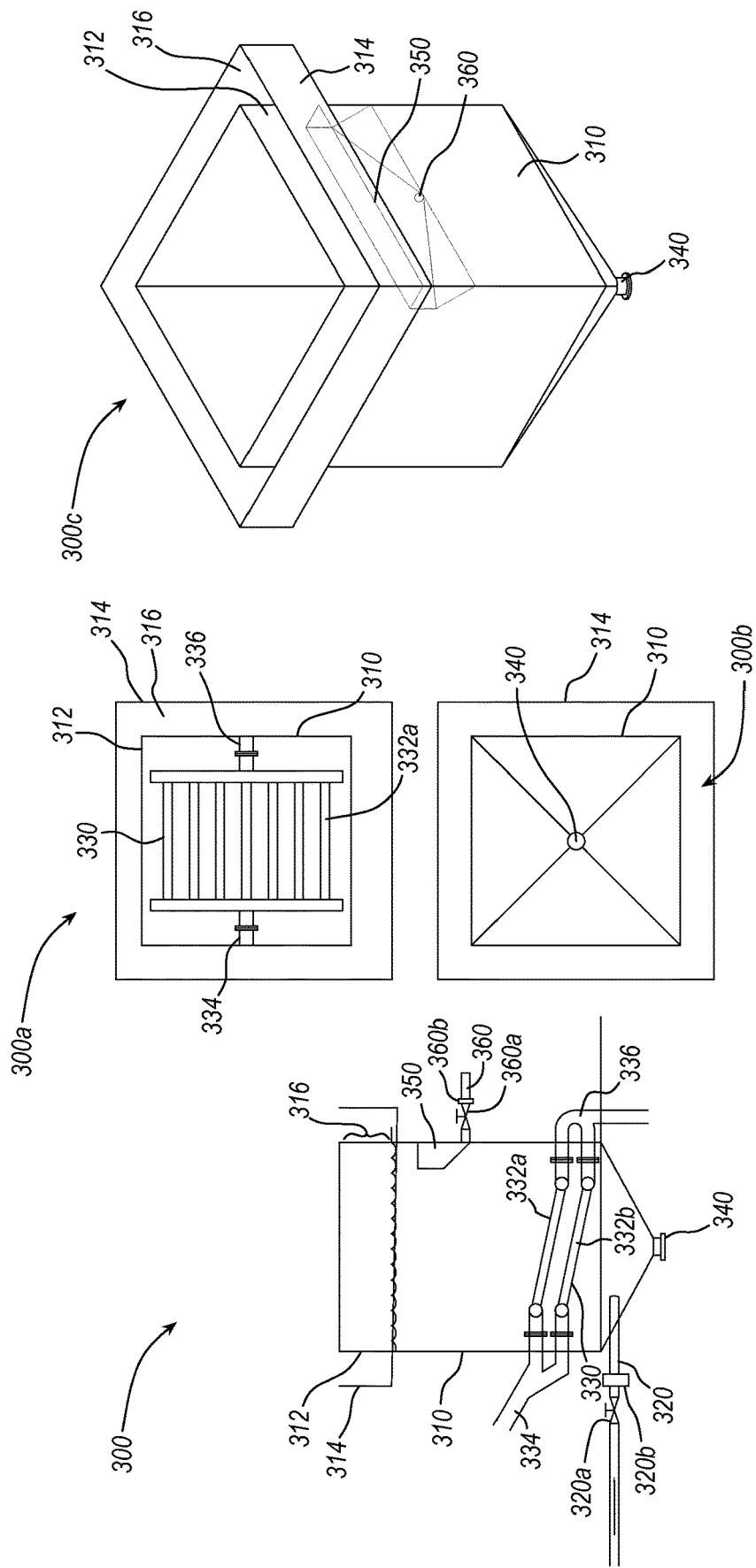
FIG. 3B is an additional detailed schematic diagram of additional aspects of the brine cooker of FIG. 3A in accordance with one or more embodiments of the invention.

In general, FIGS. 3A-3B show an example embodiment of a brine cooker 300. Turning to FIG. 3A, a detailed schematic diagram of a brine cooker 300 is illustrated. More specifically, brine cooker 300 includes a brine container 310 that holds a dirty brine solution received into the brine container 310 through inlet 320, which may further include a gate 320a and a control valve 320b. Brine container 310 also includes a top portion having an inner wall 312 and an outer wall 314. Thus, as illustrated, a cavity 316 is formed by the inner wall 312 and the outer wall 314, wherein the cavity 316 receives a portion of the solids portion of the dirty brine solution that flows over the inner wall 312.

The brine cooker 300 also includes a heating element 330 that heats the dirty brine solution within the brine container 310 to separate the dirty brine solution into a liquid portion and a solids portion. The heating element 330 includes upper sparging tubes 332a and lower sparging tubes 332b which sparge steam into the dirty brine solution. The steam enters into brine container 310 to activate heating element 330 through a heating inlet 334, which may include a pressure control valve 334a and a globe valve 334b. The steam exits brine container 310 through heating outlet 336, which may further include a globe valve 336a, a gate 336b, and a steam trap 336c positioned therebetween. In one or more other embodiments, the heating element 330 may include a sparging ring or coil. Additionally, in one or more embodiments, other heating elements may be used to heat the dirty brine solution within the brine container 310, such as a cable heater, a cartridge heater, a ceramic fiber heater, a flexible heater, a strip heater, a tubular heater, or an immersion heater.

The brine cooker 300 also includes a liquid outlet 340 coupled to the brine container 310 to remove a portion of the liquid portion of the dirty brine solution from the brine container 310. Liquid outlet 340 may further include a first gate 340a, a second gate 340b, a control valve 340c positioned between the first gate 340a and the second gate 340b, and a pump 342 positioned between the control valve 340c and the second gate 340b to provide a flow of a portion of the liquid portion of the dirty brine solution from the brine container 310 to a brine filter. In one or more embodiments, liquid outlet 340 is a pipe.

The brine cooker 300 additionally includes solids outlet 350 coupled to the brine container 310 to remove a portion of the solids portion of the dirty brine solution that flows over the inner wall 312 from brine container 310 to a brine filter. In one or more embodiments, solids outlet 350 may be an incline or a pipe.

The brine cooker 300 further includes another liquid outlet 360 coupled to the brine container 310 to remove a portion of the liquid portion of the dirty brine solution from the brine container 310 to a brine filter. Moreover, liquid outlet 360 may further include a gate 360a and a control valve 360b. In one or more embodiments, liquid outlet 360 is a pipe. The outlets of the brine cooker 310, namely liquid outlet 340, liquid outlet 360, and solids outlet 350, may be used to move the solid and liquid portions of the dirty brine solution from the brine cooker 300 to a brine filter. Furthermore, liquid outlet 340 and liquid outlet 360 primarily transport liquid portions of the dirty brine solution, but such liquid portions may still include some solids. In contrast, solids outlet 350 primarily transports solids portions of the dirty brine solution, but such solids portions may still include some liquids. Nevertheless, the solids and liquids that are outlet from brine container 310 by liquid outlet 340, liquid outlet 360, and solids outlet 350 are ultimately filtered by a brine filter as discussed in greater detail below.

Turning to FIG. 3B, an additional detailed schematic diagram of additional aspects of the brine cooker 300 of FIG. 3A is illustrated. As previously described, brine cooker 300 includes a brine container 310 that holds a dirty brine solution received through inlet 320. Brine container 310 also includes a top portion having an inner wall 312 and an outer wall 314. Thus, as illustrated, a cavity 316 is formed by the inner wall 312 and the outer wall 314. Brine cooker 300 also includes a heating element 330 that receives steam through heating inlet 334 and includes upper sparging tubes 332a and lower sparging tubes 332b. The steam then exits at heating outlet 336. Additionally, brine cooker 300 includes liquid outlet 340, liquid outlet 360, and solids outlet 350.

FIG. 3B also illustrates a top plan view 300a of brine cooker 300. Top plan view 300a shows that brine cooker 300 includes brine container 310 having inner wall 312 and outer wall 314 which form cavity 316. Within brine container 310 heating element 330 is disposed. Heating element 330 includes upper sparging tubes 332a which are arranged in a ladder or cross-bar like arrangement, with heating inlet 334 feeding hot steam into upper sparging tubes 332a of the heating element 330 and then the heating outlet 336 returning any unused steam out of the brine container 310. Upper sparging tubes 332a and lower sparging tubes 332b can be arranged in this ladder or cross-bar like arrangement, thereby each providing an array of sparging tubes to more evenly heat the dirty brine solution within brine container 310 of brine cooker 300.

FIG. 3B also illustrates a bottom plan view 300b of brine cooker 300. Bottom plan view 300b shows that the bottom of brine container 310 may be tapered, like an upside-down pyramid shape, terminating in the center with liquid outlet 340. Brine container 310 further includes outer wall 314.

FIG. 3B further illustrates a perspective view 300c of brine cooker 300, which illustrates brine container 310 includes, as already described, a top portion having an inner wall 312 and an outer wall 314. Thus, as illustrated, a cavity 316 is formed by the inner wall 312 and the outer wall 314, wherein the cavity 316 receives a portion of the solids portion of the dirty brine solution that flows over the inner wall 312 and into cavity 316. Additionally, perspective view 300c shows that liquid outlet 360 may be coupled to a solids outlet 350 in the form of an incline or ramp located at the bottom of the cavity 316 formed between inner wall 312 and outer wall 314, such that solids that overflow the inner wall 312 may slide out of the brine cooker 300 to be passed to a brine filter. Alternatively, solids outlet 350 may also be a pipe as shown in FIG. 3A. Also, perspective view 300c shows that liquid outlet 340 and liquid outlet 360 may be used to remove liquid portions of the dirty brine solution from the brine container 310.

Figure 4:
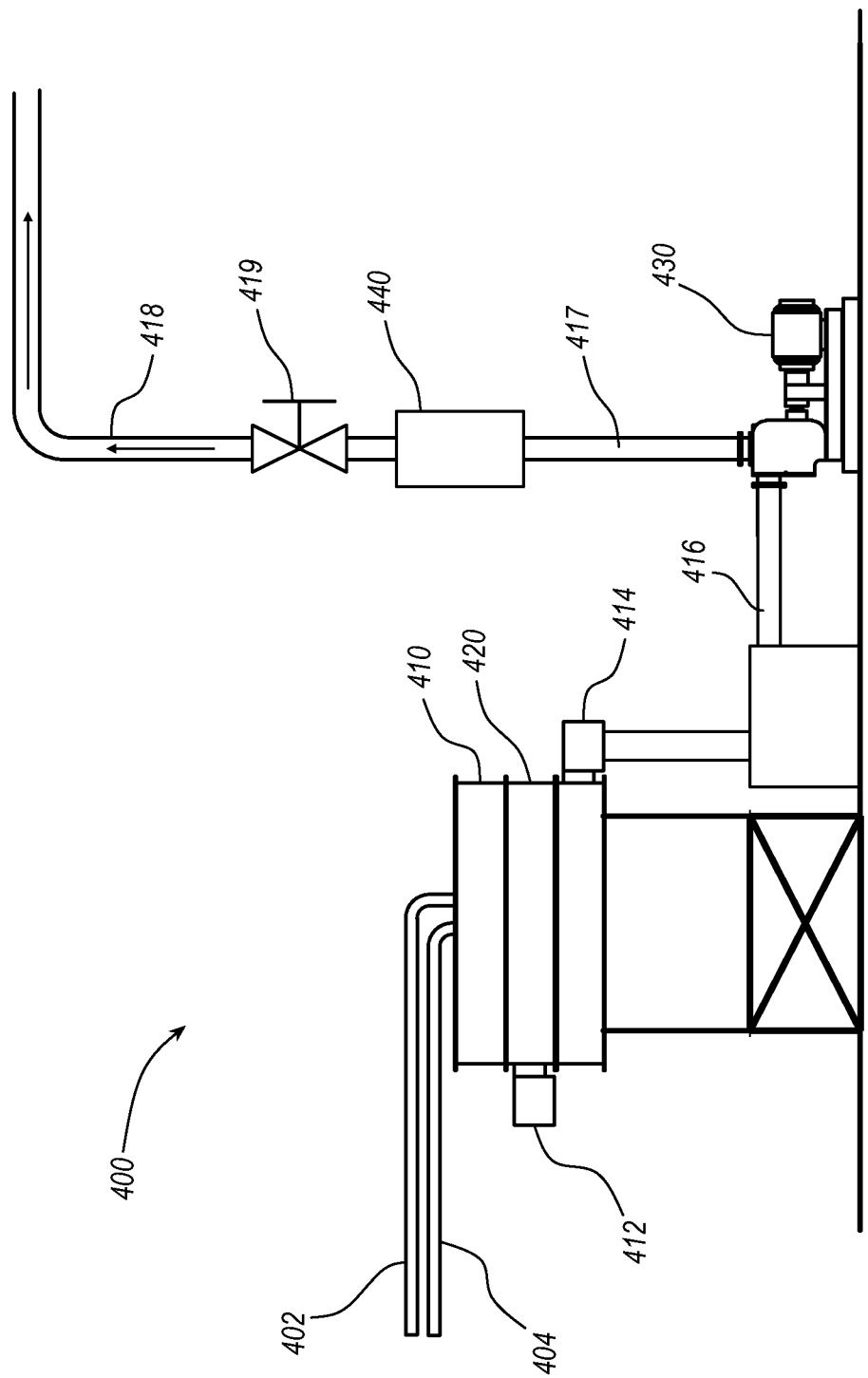
FIG. 4 is a detailed schematic diagram of a brine filter in accordance with one or more embodiments of the invention.

Turning to FIG. 4, a detailed schematic diagram of a brine filter 400 is illustrated. More specifically, brine filter 400 includes a first filter 410, a second filter 420, and a third filter 440. Additionally, brine filter 400 includes a solids outlet 412, a liquid outlet 414, and a pump 430. Brine filter may receive the dirty brine solution from one or more inlets, such as inlets 402 and 404 (e.g., coming from liquid outlet 340, liquid outlet 360, and solids outlet 350 as shown in FIGS. 3A and 3B). Inlets 402 and 404 may provide to brine filter 400 a liquid portion of the dirty brine solution, a solids portion of the dirty brine solution, or a combination of both. The first filter 410 cleans a dirty brine solution and then second filter 420 cleans the dirty brine solution after the first filter. Liquid outlet 414 provides a flow of a liquid portion of the dirty brine solution after the second filter 420 and sends the liquid portion to pump 430 through pipe 416. Pump 430 them provides the liquid portion to third filter 440 through pipe 417. Third filter 440 then cleans the flow of the liquid portion of the dirty brine solution. After passing through third filter 440, the cleaned liquid portion of the dirty brine solution travels through pipe 418 to a brine storage, such as brine storage 298 of FIGS. 2A-2C. Additionally, pipe 418 may include gate 419 to control the flow of cleaned brine solution into brine storage. In one or more embodiments, first filter 410 may have a first fineness, such as a SWECO® 50 mesh filter, second filter 420 may have a second fineness greater than the first fineness, such as a SWECO® 200 mesh filter, and third filter may have a third fineness, such as 400 microns. Additionally, the filters of brine filter 400 can be any suitable filter that further removes solids from the dirty brine solution, such as screen filters and bag filters.

Figure 5:
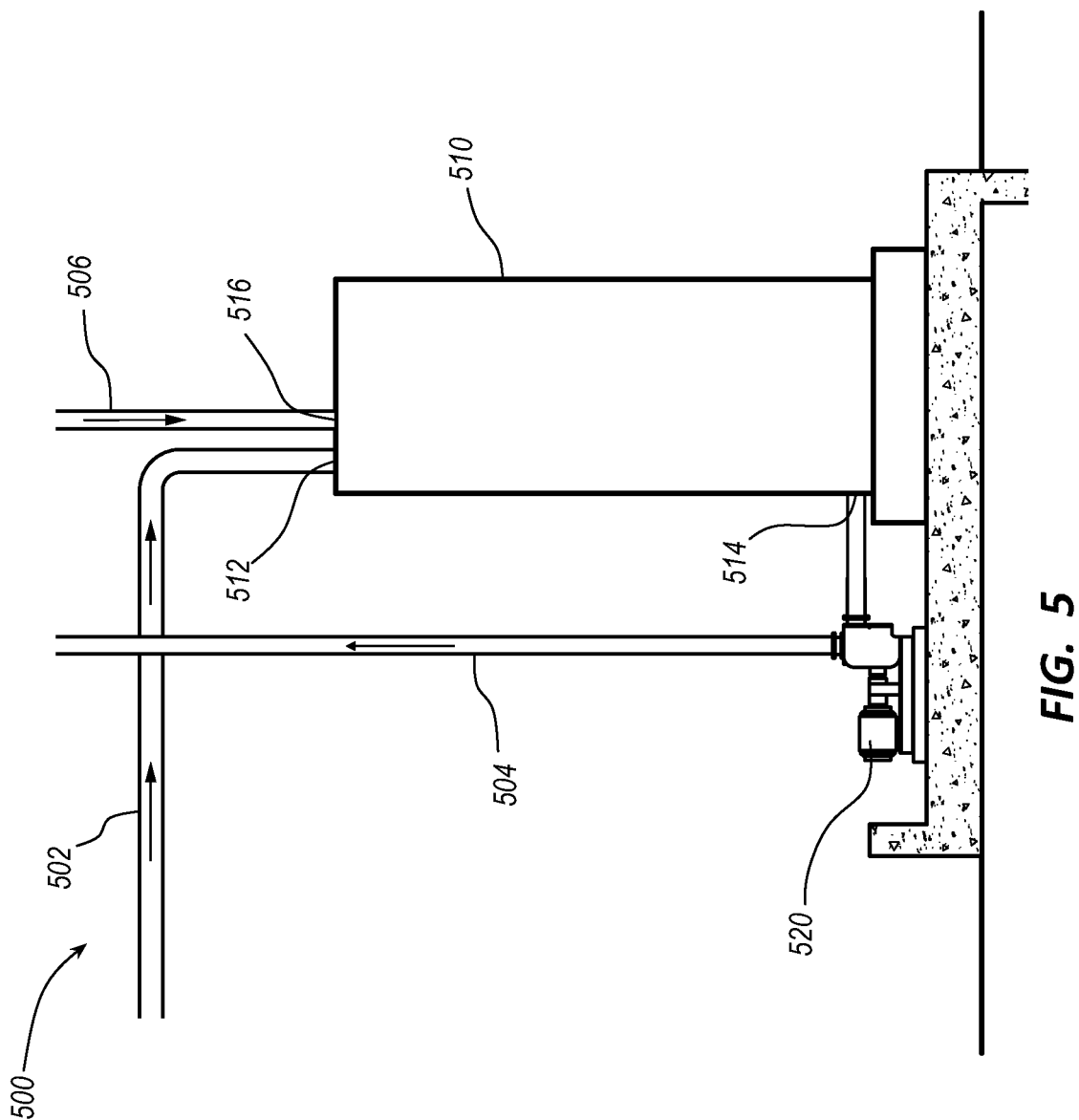
FIG. 5 is a detailed schematic diagram of a brine storage in accordance with one or more embodiments of the invention.

Turning to FIG. 5, a detailed schematic diagram of a brine storage 500 is illustrated. In particular, brine storage 500 includes a brine storage container 510, a liquid inlet 512, and a liquid outlet 514. Additionally, brine storage 500 includes an additional liquid outlet 516, as well as a pump 520. Liquid inlet 512 and liquid outlets 514 and 516 may all respectively be coupled to corresponding pipes 502, 504, and 506, with pump 520 providing a flow of liquid from the brine storage container 510 out of liquid outlet 514 and through pipe 504 (e.g., back into brine cooker 280 as shown in FIG. 2C or back into brine cooker 300 through inlet 320 as shown in FIGS. 3A-3B). Liquid inlet 512 may receive a flow of cleaned brine solution into brine storage container 510 through pipe 502 (e.g., from brine filter 400 of FIG. 4, such as after cleaned brine solution passes through third filter 440). Liquid inlet 516 may receive a flow of brine solution into brine storage container 510 through pipe 506 (e.g., from evaporator and salt concentrator 260 of FIGS. 2A-2C).

Figure 6:
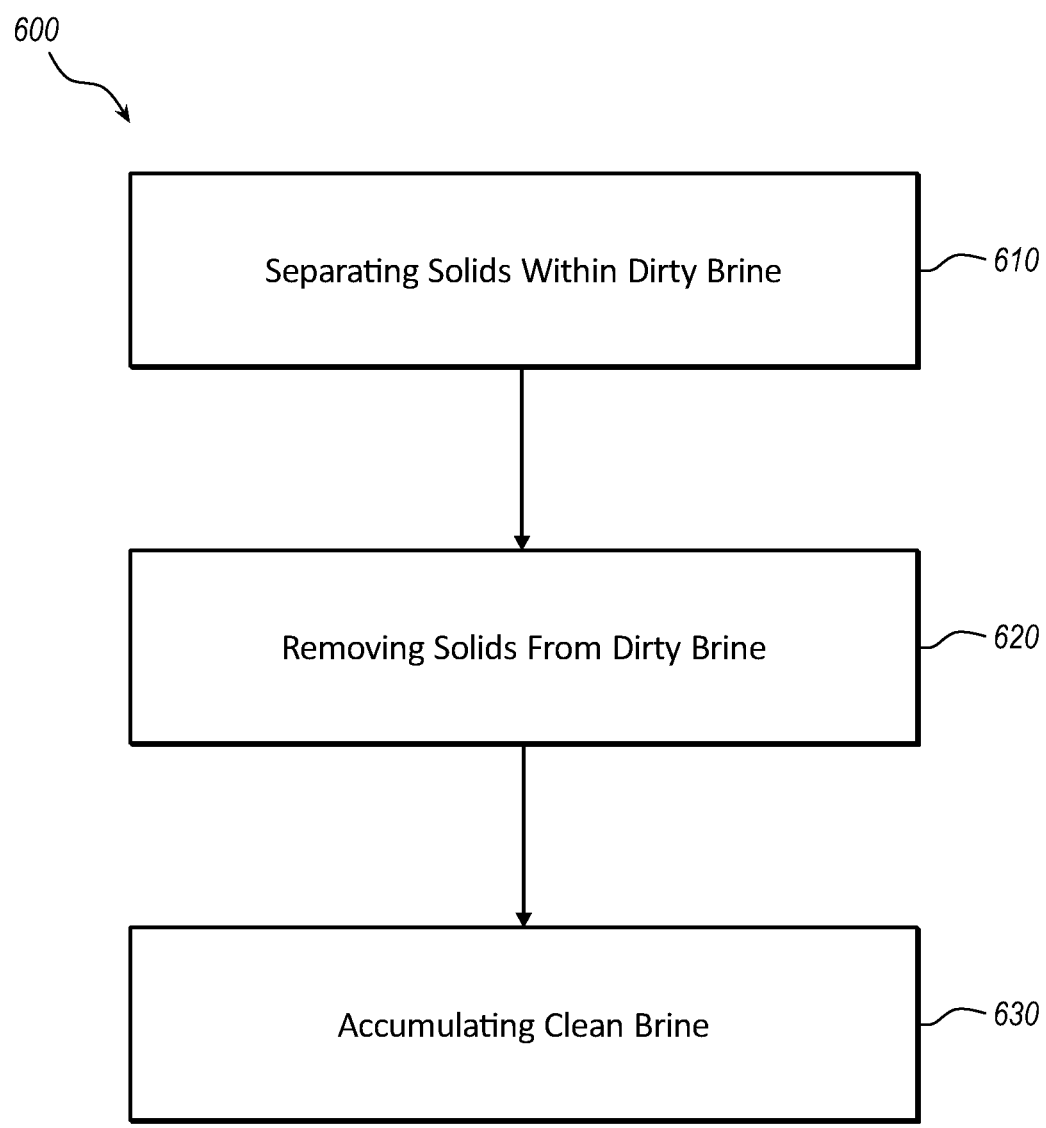
FIG. 6 is a flowchart of a series of acts in a method of brine cleaning in accordance with one or more embodiments of the invention.

Turning to FIG. 6, a flowchart of a series of acts in a method of brine cleaning is shown. More specifically, FIG. 6 illustrates a method 600 that includes steps 610-630. In particular, the method 610 includes a first step of separating solids within dirty brine solution 610. This first step 610 can further include heating the dirty brine solution (e.g., in brine cooker 300 of FIGS. 3A-3B). More specifically, heating the dirty brine solution can further include heating the dirty brine solution at 212 degrees Fahrenheit for 10 minutes in order to cause solids within the dirty brine solution to coagulate. For example, typically when solids in a dirty brine solution coagulate from heating, the solids rise to the surface and the liquids settle to the bottom. This first step 610 can also include capturing coagulated solids within the dirty brine solution and removing the captured coagulated solids from a liquid portion of the dirty brine solution. More specifically, capturing coagulated solids within the dirty brine solution can further include causing coagulated solids to overflow a top of a brine cooker, thereby falling into a cavity of the brine cooker that is separate from an interior of the brine cooker used to heat the dirty brine solution (e.g., cavity 316 of brine cooker 300 of FIGS. 3A-3B). Additionally, removing the captured coagulated solids from a liquid portion of the dirty brine solution can include using an incline to cause the coagulated solids to be separated from the liquid portion of the dirty brine solution (e.g., by sliding the coagulated solids down solids outlet 350 of brine cooker 300 as shown in FIG. 3B). Alternatively or additionally, removing the captured coagulated solids from a liquid portion of the dirty brine solution can include using a pipe (with or without the assistance of a pump) to cause the coagulated solids to be separated from the liquid portion of the dirty brine solution (e.g., by transporting the coagulated solids through a pipe connected to solids outlet 350 of brine cooker 300 as shown in FIG. 3A).

The method 600 also includes a second step of removing solids from the dirty brine solution to create a clean brine solution 620. This second step 620 can further include filtering the solids from the dirty brine solution. More specifically, filtering the solids from the dirty brine solution can further include applying a first filter having a first fineness to the solids of the dirty brine solution, applying a second filter having a second fineness to the solids of the dirty brine solution, and applying a third filter having a third fineness to the solids of the dirty brine solution to output the clean brine solution from the third filter (e.g., first filter 410, second filter 420, and third filter 440 of brine filter 400 as shown in FIG. 4). Applying a first filter having a first fineness to the solids of the dirty brine solution can include extracting solids larger than the first fineness from the dirty brine solution through a first outlet (e.g. the top of brine filter 400 as shown in FIG. 4). Along similar lines, applying a second filter having a second fineness to the solids of the dirty brine solution can include extracting solids larger than the second fineness from the dirty brine solution through a second outlet (e.g. solids outlet 412 of brine filter 400 as shown in FIG. 4). Similarly, applying a third filter having a third fineness to the solids of the dirty brine solution to output the clean brine solution from the third filter can include extracting solids larger than the third fineness from the dirty brine solution (e.g., third filter 440 as shown in FIG. 4).

The method 600 further includes a third step of accumulating the clean brine solution 630. This third step 630 can further include storing the clean brine solution in a brine storage unit (e.g., brine storage 298 as shown in FIGS. 2A-2C). This step can further include outputting clean brine solution back a brine cooker for further cleaning (e.g., brine cooker 300 of FIGS. 3A-3B). Also, this step can include providing clean brine to a wastewater disposal site, such as a brine pond or similar.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A brine cleaning system comprising:
a brine cooker that heats a dirty brine solution to separate the dirty brine solution into a liquid portion and a solids portion;
a brine filter that removes the solids portion, the brine filter coupled to the brine cooker to receive the liquid portion and the solids portion from the brine cooker; and
a brine storage unit that accumulates the liquid portion, the brine storage unit coupled to the brine filter to receive the liquid portion from the brine filter.

2. The system as recited in claim 1, further comprising an incline having a first end and a second end, the first end of the incline coupled to a top of the brine cooker and the second end of the incline coupled to a top of the brine filter to provide a flow of the solids portion from the brine cooker to the brine filter down the incline.

3. The system as recited in claim 1, further comprising a brine curing hide vat that creates the dirty brine solution, the brine curing hide vat coupled to the brine cooker to provide the dirty brine solution to the brine cooker.

4. The system as recited in claim 3, further comprising a pipe having a first end and a second end, the first end of the pipe coupled to an outlet of the brine curing hide vat and the second end of the pipe coupled to an inlet of the brine cooker.

5. The system as recited in claim 1, further comprising an evaporator and salt concentrator that separates the liquid portion into a water portion and a salt portion, the evaporator and salt concentrator coupled to the brine storage unit to receive the liquid portion from the brine storage unit.

6. The system as recited in claim 5, further comprising a pipe having a first end and a second end, the first end of the pipe coupled to an outlet of the brine storage unit and the second end of the pipe coupled to an inlet of the evaporator and salt concentrator.

7. The system as recited in claim 1, further comprising:
a bottom pipe having a first end and a second end, the first end of the bottom pipe coupled to a bottom outlet of the brine cooker and the second end of the bottom pipe coupled to an inlet of the brine filter, the bottom pipe providing a first flow of the liquid portion from the brine cooker to the brine filter;
a top pipe having a first end and a second end, the first end of the top pipe coupled to a top outlet of the brine cooker and the second end of the top pipe coupled to the inlet of the brine filter, the top pipe providing a second flow of the liquid portion from the brine cooker to the brine filter; and
an incline having a first end and a second end, the first end of the incline coupled to a top the brine cooker and the second end coupled to the inlet of the brine filter, the incline providing a flow of the solids portion from the brine cooker to the brine filter.

8. A brine cleaning system comprising:
a brine cooker that heats a dirty brine solution to separate the dirty brine solution into a liquid portion and a solids portion, the brine cooker comprising:
a brine container that holds the dirty brine solution; and
a heating element that heats the dirty brine solution within the brine container;
a brine filter that cleans the dirty brine solution, the brine filter coupled to the brine cooker to receive the liquid portion and the solids portion from the brine cooker, the brine filter comprising:
a first filter;
a second filter after the first filter; and
a third filter that further cleans the liquid portion after the second filter; and
a brine storage unit that accumulates a filtered liquid portion, the brine storage unit coupled to the brine filter to receive the filtered liquid portion.

9. The system as recited in claim 8, wherein the heating element comprises a plurality of sparging tubes.

10. The system as recited in claim 9, wherein the plurality of sparging tubes comprises:
a first array of sparging tubes; and
a second array of sparging tubes positioned below the first array of sparging tubes.

11. The system as recited in claim 10, wherein the heating element comprises one of a cable heater, a cartridge heater, a ceramic fiber heater, a flexible heater, a strip heater, a tubular heater, or an immersion heater.

12. The system as recited in claim 8, further comprising a pump positioned between the second filter and the third filter, the pump facilitating a flow of the liquid portion from the second filter to the third filter.

13. The system as recited in claim 8, further comprising:
a solids outlet coupled to a filter housing and positioned between the first filter and the second filter; and
a liquid outlet coupled to the filter housing and positioned after the second filter.

14. The system as recited in claim 8, wherein the first filter has a first fineness, the second filter has a second fineness, and the third filter has a third fineness, such that the first fineness is less than or equal to the second fineness and the second fineness is less than or equal to the third fineness.

15. A method of cleaning brine, the method comprising:
separating solids within a dirty brine solution by heating the dirty brine solution to cause solids to overflow a top of a brine cooker and fall into a cavity of the brine cooker, wherein the cavity is separate from an interior of the brine cooker that contains the dirty brine solution;
removing additional solids from the dirty brine solution to create a cleaned brine solution; and
accumulating the cleaned brine solution.

16. The method as recited in claim 15, wherein heating the dirty brine solution comprises heating the dirty brine solution at 212 degrees Fahrenheit for 10 minutes in order to cause solids within the dirty brine solution to coagulate.

17. The method as recited in claim 15, wherein removing additional solids from the dirty brine solution to create a cleaned brine solution further comprises filtering additional solids from the dirty brine solution.

18. The method as recited in claim 17, wherein filtering additional solids from the dirty brine solution comprises:
applying a first filter having a first fineness to the dirty brine solution;
applying a second filter having a second fineness to the dirty brine solution; and
applying a third filter having a third fineness to the dirty brine solution to output the cleaned brine solution from the third filter.

19. The method as recited in claim 18:
wherein applying a first filter having a first fineness to the dirty brine solution further comprises extracting additional solids larger than the first fineness from the dirty brine solution;
wherein applying a second filter having a second fineness to the dirty brine solution further comprises extracting additional solids larger than the second fineness from the dirty brine solution; and
wherein applying a third filter having a third fineness to the dirty brine solution to output the cleaned brine solution from the third filter further comprises extracting additional solids larger than the third fineness from the dirty brine solution.

* * * * *